(12) United States Patent
Zolotov (10) Patent No.: US 8,720,782 B2
(45) Date of Patent: *May 13, 2014

(54) SYSTEM AND METHOD FOR COMPENSATING FOR MOTION RELATIVE TO A BARCODE

(71) Applicant: Psion Inc., Mississauga (CA)

(72) Inventor: Serguei Zolotov, Ottawa (CA)

(73) Assignee: Psion Inc., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,319

(22) Filed: Jan. 8, 2013

(65) Prior Publication Data

US 2013/0126616 A1 May 23, 2013

Related U.S. Application Data

(63) Continuation of application No. 13/209,486, filed on Aug. 15, 2011, now Pat. No. 8,371,505.

(51) Int. Cl.
*G03B 7/08* (2006.01)

(52) U.S. Cl.
USPC .................................. 235/462.24

(58) Field of Classification Search
USPC ............. 235/454, 462.01, 462.23–462.25, 235/472.01–472.03
See application file for complete search history.

(56) References Cited

U.S. PATENT DOCUMENTS

| 5,841,121 | A | 11/1998 | Koenck |
|---|---|---|---|
| 7,407,096 | B2 | 8/2008 | McQueen et al. |
| 7,712,670 | B2 | 5/2010 | Sauerwein et al. |
| 8,146,821 | B2 | 4/2012 | Barkan et al. |
| 2005/0236488 | A1 | 10/2005 | Kricorissian |
| 2009/0001170 | A1 | 1/2009 | He |
| 2009/0166426 | A1 | 7/2009 | Giebel et al. |

OTHER PUBLICATIONS

Notice of Allowance mailed Oct. 9, 2012 in counterpart U.S. Appl. No. 13/209,486, Serguei Zolotov, filed Aug. 15, 2011.
European Search Report mailed Jul. 17, 2013 in counterpart Application No. 12177634.8.

*Primary Examiner* — Seung Lee (57) ABSTRACT

A barcode decoding system and method for compensating for motion of between an image sensor and a barcode to improve decoding of the barcode. The barcode decoding system includes an imager for capturing an image of the barcode, a motion sensor for collecting acceleration data and a processor that is configured to determine a velocity of the image sensor during the exposure period based on the acceleration data and a periodic motion model. The determined velocity is used to adjust the edge detection algorithm used to detect the barcode features in order to decode the barcode. The orientation of the captured barcode can also be determined in order to determine the velocity in a direction perpendicular to the barcode features.

20 Claims, 6 Drawing Sheets

SYSTEM AND METHOD FOR COMPENSATING FOR MOTION RELATIVE TO A BARCODE

CROSS REFERENCE TO RELATED APPLICATION

This application is a continuation of U.S. patent application Ser. No. 13/209,486, filed Aug. 15, 2011, which issued on Feb. 12, 2013, as U.S. Pat. No. 8,371,505, the entire contents of which are incorporated herein by reference.

FIELD

The present disclosure relates generally to a system and method for reading barcodes, more specifically the disclosure relates to barcode reading devices using image sensors.

BACKGROUND

Barcode symbols provide a fast and accurate means of representing information about an object. Decoding or reading a barcode is accomplished by translating the pattern of barcode features, such as bars and spaces in linear (1D) barcodes or blocks or other features in a two-dimensional (2D) barcode, into the corresponding numbers or characters. Barcodes are widely used for encoding information and tracking purposes in retail, shipping and industrial settings.

Barcodes are typically read by a handheld barcode reading device that includes a camera or imager (these terms being used interchangeably herein) for capturing an image of the barcode. Since the reading device is handheld, the quality of the captured image can suffer due to hand movement of the reading device relative to the barcode during the image capture period. For example, movement in the direction perpendicular to the bars and spaces with a linear barcode can result in a blurring that causes misdetection of the edges between the bars and spaces in decoding the barcode. For 2D barcodes, motion in any direction can induce image blur that results in misdetection of the barcode feature. The image blurring problem can be exasperated when using low cost image sensors that require longer exposure periods to capture images with suitable signal to noise ratios or when attempting to capture an image of a barcode under less than ideal lighting condition which also requires a relatively longer exposure period.

Optical stabilization techniques are often used to reduce blurring associated with the motion of a camera during exposure to compensate for movement of the imaging device. Optical stabilization varies the optical path to the image sensor of the camera in response to movement. This technology can be implemented in the lens itself, or by moving the sensor as the final element in the optical path. The key element of all optical stabilization systems is that they stabilize the image projected on the sensor before the sensor converts the image into digital information. Optical stabilization techniques typically require additional sensors, such as gyroscopes and accelerometers, and devices to move lenses or sensors in the optical path. These additional sensors and devices create a number of potential disadvantages in a handheld device, such as increasing the expense of the handheld device, increasing the number of moving parts in the handheld device, possibly reducing the overall reliability, and increasing the power consumption within the handheld device.

Another known technique used to minimize motion blur relies on using an accelerometer to detect pauses in hand motion. This technique only allows the camera to attempt to capture an image during a detected pause in motion. This technique requires knowledge of the expected motion pattern of hand jitter in order to correctly detect the pauses. This technique is used by some cell phone cameras, one example being the Glogger VS2 software available for Nokia phones running on Symbian OS. Published U.S. Patent Application 20050236488 to Kricorissian, and assigned to the assignee of the present invention, discusses another implementation of a delay-based system. These approaches have proven not to be practicable for barcode readers because they often create an unacceptable delay when capturing the image of the barcode. Furthermore, these approaches may still result in blurring of the captured image in lower light environments or when using a low-cost image sensor where a longer exposure time is required since these approaches do not prevent blurring or compensate for blur causing movement, but instead merely attempt to avoid capturing the image of the barcode when movement is occurring.

An alternative approach to reduce image blurring is to reduce exposure times. However, imagers used in barcode reading devices are typically lower cost image sensors that require relatively longer exposure times. In the scanning environments where barcode reading devices are typically used, the light levels are often not sufficient to use reduced exposure times to eliminate image blurring. Providing supplementary lighting, such as a flash or other light source, can reduce the exposure time, but would result in increased power consumption by the handheld device with a commensurate reduction in the useful operating time of the battery powered handheld device.

SUMMARY

Accordingly, there is a need for a system and method for compensating for motion between an image sensor and barcode when capturing an image of the barcode.

According to a first aspect, there is provided a method for compensating for motion between an image sensor and a barcode, the method comprising the steps of capturing an image of the barcode using the image sensor; determining a velocity between the image sensor and the barcode based on acceleration data provided by a motion sensor, the velocity determined for an exposure period of the image sensor to capture the image; selecting at least one parameter for edge detection processing of the barcode based on the determined velocity to compensate for blurring of the image due to the determined velocity; and detecting edges of features of the barcode in the captured image using the at least one parameter to decode the barcode. Preferably, the motion sensor and image sensor are included in a handheld barcode scanner. Also preferably, the step of determining the velocity comprises calculating a previous velocity of the image sensor, and adjusting the previous velocity with the acceleration data to determine the velocity. Also preferably, the determined velocity is calculated using a motion model, such as a periodic or quasi-periodic motion model. Also preferably, the method further includes the step of determining the velocity in a direction substantially perpendicular to edges of features of barcode.

According to a second aspect of the present invention, there is provided a barcode decoding system for capturing and decoding a barcode, the system comprising: an image sensor for capturing an image of the barcode; a motion sensor for collecting acceleration data for motion between the image sensor and the barcode; and a processor configured to determine a velocity of the motion between the image sensor and the barcode based on the acceleration data, the velocity determined for an exposure period of the image sensor to capture of the image, the processor further configured to select at least one parameter for edge detection processing of the barcode based on the determined velocity to compensate for blurring of the image due to the determined velocity, and the processor further configured to detect edges of features of the barcode using the at least one parameter to decode the barcode.

BRIEF DESCRIPTION OF THE DRAWINGS

Embodiments of the present invention will now be described, by way of example only, with reference to the attached drawings, wherein.

DESCRIPTION OF VARIOUS EMBODIMENTS

It will be appreciated that for simplicity and clarity of illustration, where considered appropriate, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computers can include handheld computing devices, or the combination of a portable or fixed computing device with a handheld barcode scanner where either the computing device or the handheld barcode scanner can be programmable. Program code may operate on input data to perform the functions described herein and generate output data.

Figure 1:
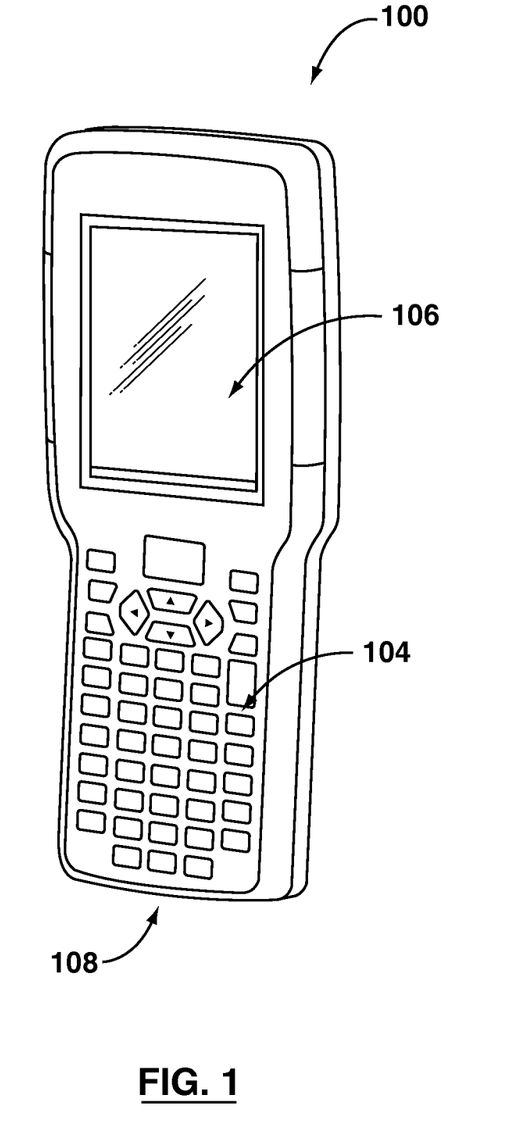
FIG. 1 is a perspective view of a handheld computing device.
Figure 2:
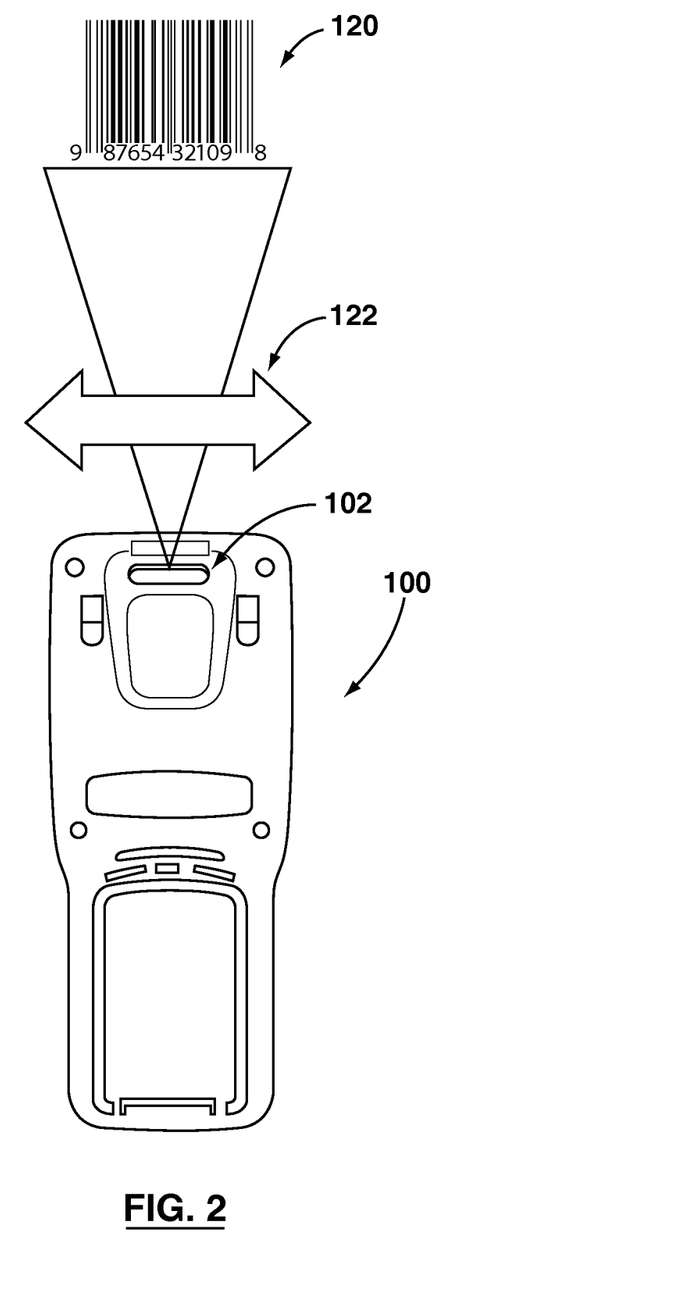
FIG. 2 is a rear view of the handheld computing device of FIG. 1 illustrating motion of the handheld computing device relative to a barcode.

Reference is first made to FIGS. 1 and 2 which show a handheld computing device 100 having a barcode scanner 102 that provides optical barcode scanning functionality. Handheld computing device 100 can be any of a wide range of digital devices that provides barcode reading functionality including, without limitation, devices which generate digital information, such as computer terminals, RFID readers and optical scanning devices, including dedicated barcode scanning devices, digital photo and document scanners. Handheld computing device 100 is a handheld portable device, such as a mobile computer, mobile phone, handheld terminal, digital camera, scanner or other electronic device configured to capture and decode barcode images. Barcode scanner 102, as described in further detail below, may comprise a set of hardware, firmware, and system software, employed in any suitable combination in order to capture an image of barcode 120 using an image sensor.

Handheld computing device 100 can further include a keyboard 104 for user input, a display screen 106, and an expansion port 108. Examples of expansion port 108 can include a Universal Serial Bus (USB) port or other similar expansion port for coupling compatible peripheral devices such as, but not limited to, a communication and synchronization cradle for handheld computing device 100.

As used herein, the term barcode refers to an optical machine-readable representation of information. Typically, barcodes encode information in the widths and the spacing of parallel lines, sometimes referred to as bars, and may be referred to as linear or 1D (one-dimensional) barcodes or symbologies. Barcode 120 is provided as an example of a linear barcode. Barcodes can also encode information in patterns of squares, dots, hexagons and other geometric shapes or symbols within images termed 2D (two-dimensional) matrix codes or symbologies. Although 2D barcodes use features other than bars, they are generally referred to as barcodes as well. Accordingly, the barcode images discussed herein for use with barcode scanner 102 can refer to either 1D or 2D barcodes. As will be described, the barcodes can be read by an optical scanner or reader referred to collectively as barcode scanner 102. As used herein, the objects used to encode the information, such as bars, squares, etc., are referred to as features. For example, the features of barcode 120 can refer to the either the black or white bars that comprise barcode 120. Barcodes can also be black-and-white or color.

Arrow 122 is used to represent motion of barcode scanner 102 and handheld computing device 100 relative to barcode 120. It is difficult for a user to maintain handheld computing device 100 steady while capturing barcode 120 and this movement can induce motion blur in the captured image that could affect the ability of handheld computing device 100 to decode barcode 120.

Figure 3:
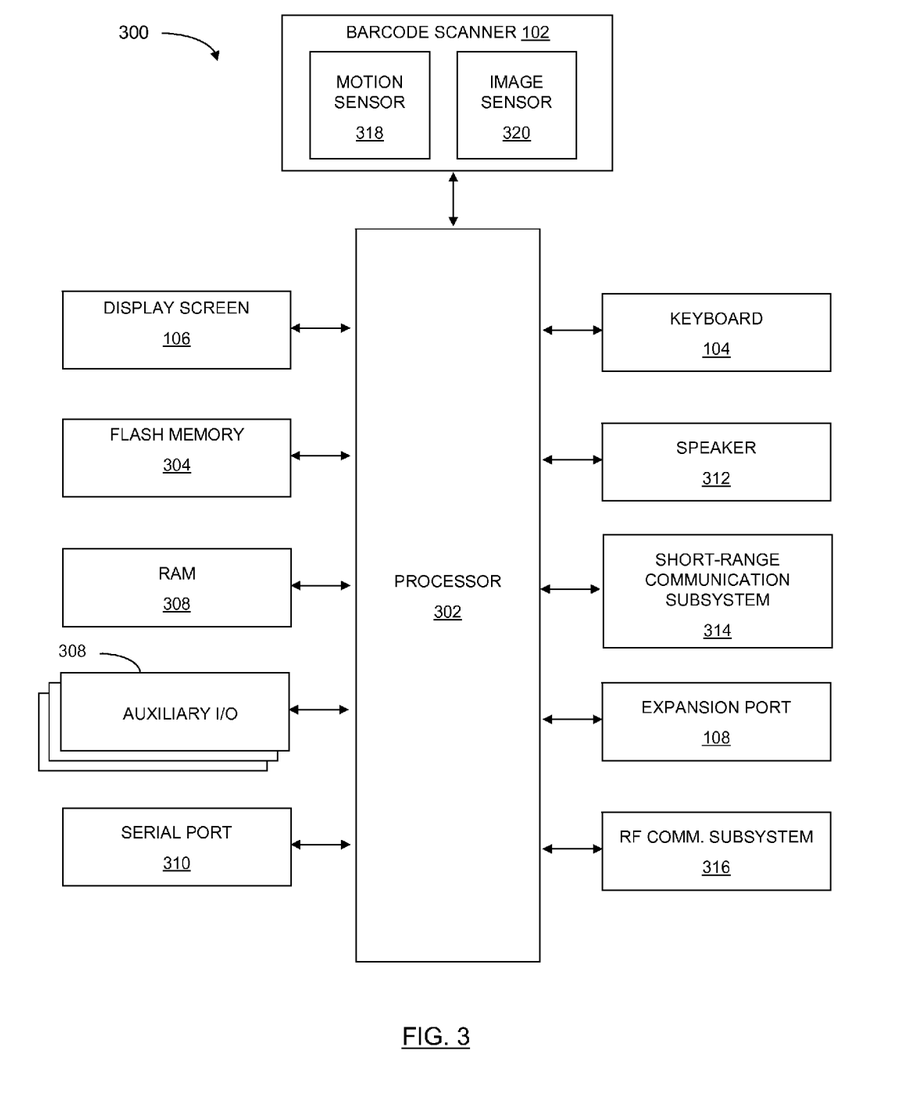
FIG. 3 is a block diagram of a barcode decoding system illustrating the interconnection of the functional subsystems.

Referring now to FIG. 3, a block diagram of a barcode decoding system 300 is shown illustrating the interconnection of the functional subsystems. Handheld computing device 100 can include barcode decoding system 300 to provide barcode decoding and other functions. Barcode decoding system 300 comprises a processor 302 that controls general operation of the system. Processor 302 interacts with functional device subsystems, which can include subsystems such as display screen 106, flash memory 304, random access memory (RAM) 306, auxiliary input/output (I/O) subsystems 308, serial port 310, keyboard 104, speaker 312, short-range communications subsystem 314, such as Bluetooth™ for example, and expansion port 108. Barcode decoding system 300 can include a power source such as battery module (not shown) that can be removable and replaceable. While the illustrated embodiment of barcode decoding system 300 includes the functional subsystems described above, it will be apparent to those of skill in the art that barcode decoding system 300 can omit some of these subsystems and/or can include additional subsystems as required to meet an intended field of use for barcode decoding system 300.

Barcode decoding system 300 can have the capability of communicating at least data, and possibly any of data, audio and voice communications, to and from other devices connected by a communication network, as well as data acquisition sources within a communication network. Barcode decoding system 300 can include wired or wireless communication capability. In the wireless configuration, barcode decoding system 300 typically includes radio frequency (RF) communication subsystem 316, which includes a receiver, a transmitter, and associated components, such as one or more embedded or internal antennae, and a processing module such as a digital signal processor (DSP) or the like. As will be apparent to those skilled in field of communications, the particular design of RF communication subsystem 316 depends on the specific communication networks in which barcode decoding system 300 is intended to operate, and can include communication functionalities such as radio-frequency identification (RFID), Wi-Fi WLAN based on IEEE 802.11 standards, Zigbee, Z-Wave, GSM EDGE, 1EVDO, HSPDA, and the like.

Still with regard to FIG. 3, operating system software can be executed by processor 302 that is stored in a persistent storage such as flash memory 304, or alternatively, in other read-only memory (ROM) or similar storage elements (not shown). Those skilled in the art will appreciate that an operating system, specific device applications, or parts thereof, may be temporarily loaded into a volatile store such as RAM 306.

Processor 302, in addition to its operating system functions, can also enable execution of software applications on barcode decoding system 300. A predetermined set of applications, which control basic device operations, or more customized, advanced device operations, may be installed on barcode decoding system 300 during its manufacture, such as during the components configuration process.

Display screen 106 of barcode decoding system 300 may be used to visually present a software application's graphical user interface (GUI) to a user via display screen 106. Display screen 106 can employ a touch screen display, in which case the user can manipulate application data by modifying information on the GUI using direct touches by a finger or stylus. Depending on the type of handheld computing device 100, the user may have access to other types of input devices, such as, for example, a scroll wheel, trackball or light pen.

A graphical user interface presented on display screen 106 of barcode decoding system 300 may enable an operator or administrator to interact with handheld computing device 100. It is further contemplated that barcode decoding system 300 may be communicatively coupled to a remotely located database (not shown).

Barcode decoding system 300 further comprises barcode scanner 102. Barcode scanner 102 can be integrated with handheld computing device 100 as shown in FIGS. 1 and 2. In other embodiments, barcode scanner 102 can comprise a secondary handheld enclosure that can includes motion sensor 318 and some of other the subsystems illustrated in FIG. 3. For example, barcode scanner 102 can be a pistol scanner that is communicatively tethered to barcode decoding system 300. The pistol scanner can include motion sensor 318 and image sensor 320, and the pistol scanner can further include a trigger and logic to control the operation of the pistol scanner. The pistol scanner can be tethered to barcode decoding system 300 either by wire, such as a USB link, or through a wireless protocol that communicates with short-range communication subsystem 314 of handheld computing device 100. The term "handheld barcode scanner" as used herein can refer to either barcode scanner 102 integrated within handheld computing device 100 or a secondary handheld enclosure with barcode scanner 102 that can connect to the subsystems of barcode decoding system 300.

Barcode scanner 102 can comprise any suitable combination of software, firmware and hardware to implement scanning of barcode 120 using image sensor 320. Image sensor 320 can further include a light source and a lens (not shown). The light source and lens can be controlled by image sensor 320 or processor 302. The lens can be a fixed focus lens with a suitable depth of field, or can be an auto-focus lens. Image sensor 320 can be a CCD, CMOS or other suitable image sensor.

If barcode scanner 102 is implemented in a secondary handheld enclosure, barcode scanner 102 can further include a motion sensor 318 that can provide acceleration data with respect to the motion of barcode scanner 102. Acceleration data is used by barcode scanner 102 to recover the velocity of barcode scanner 102. If barcode scanner 102 is integrated with handheld computing device 100, motion sensor 318 can be a separate subsystem connecting to barcode decoding system 300 in order to provide acceleration data with respect to the motion of barcode scanner 102. In some embodiments, motion sensor 318 can be an accelerometer that provides linear/translational acceleration data in one or more planes of movement according to the axes of the accelerometer (e.g. x, y, and z). In other embodiments, motion sensor 318 can be a gyroscope that has axes to measures pitch, yaw and roll and provides acceleration data in the form of degrees per second. Using the distance from barcode 120, which can be estimated based on focal length or other factors, angular acceleration data from the gyroscope can be used to approximate translational acceleration data similar to that obtained from an accelerometer. A gyroscope can also provide positional orientation information relative to a reference position. Acceleration data may be provided from both an accelerometer and a gyroscope to provide more accurate acceleration data. Motion sensor 318 can be implemented as a MEMS sensor and can include either an accelerometer, a gyroscope, or a combination thereof in a single part. Velocity can be determined from the acceleration data provided by motion sensor 318 as will be described further below.

Acceleration data can further include timestamp data that may be used to determine velocity. Depending on where acceleration data is processed, motion sensor 318 can provide acceleration data to processor 302 or directly to barcode scanner 102.

In most cases it is assumed that barcode 120 is static (or moving an insignificant amount) and the motion of barcode scanner 102 and image sensor 320 with respect to barcode 120 causes image blur in the capture image. However, in some embodiments, barcode 120 may be moving with respect to a static barcode scanner 102. In that case, motion sensor 318 can be used to provide movement information of barcode 120 to capture motion of barcode 120 as opposed to motion of barcode scanner 102 and image sensor 320. For example, if image sensor 320 is statically mounted to capture images of barcode 120 placed on a moving object, such as a conveyor or platform, motion sensor 318 can capture this movement and provide it to barcode decoding system 300. For example, motion sensor 318 can provide acceleration data of a conveyor or platform that barcode decoding system 300 can use to determine the velocity between image sensor 320 and barcode 120 (i.e. the velocity of the conveyor or platform in this case).

Figure 4:
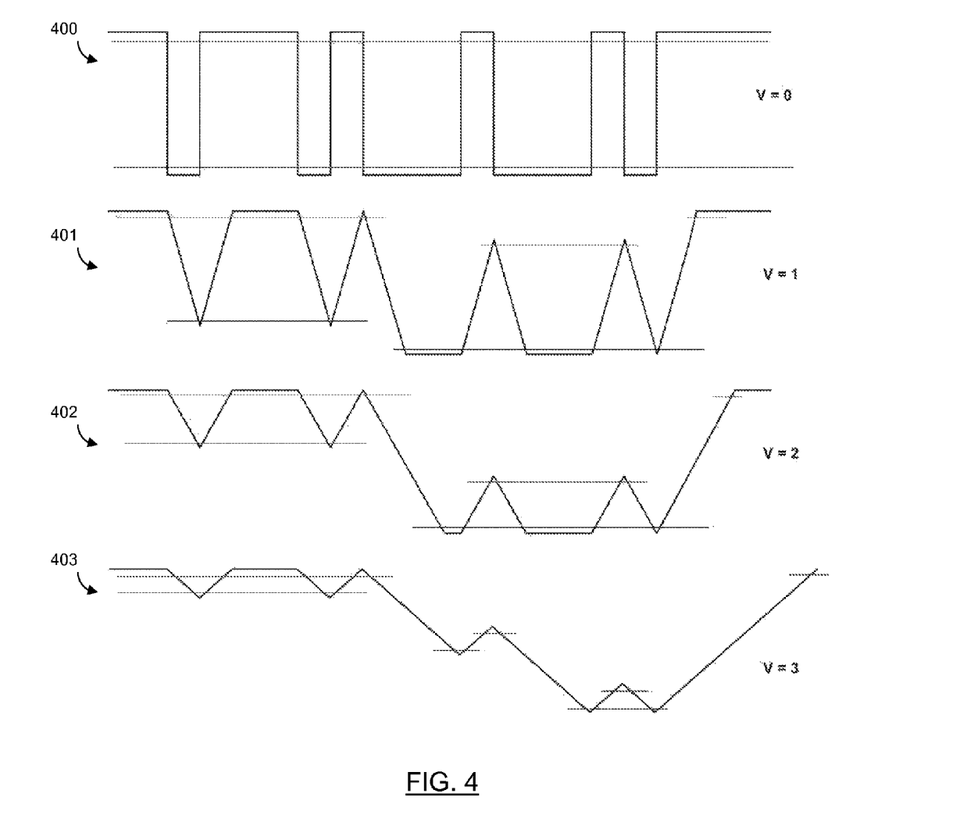
FIG. 4 is a series of four graphs illustrating the effects of the velocity between an image sensor of a barcode scanner and a barcode when capturing an image of a linear barcode.

Referring now to FIG. 4, a series of four graphs are shown that illustrate the effects of the velocity between image sensor 320 and barcode 120 when capturing an image of a linear barcode. Each graph illustrates reading the start/stop pattern of a standard C39 barcode at a different velocity, v, with respect to image sensor 320. The vertical axes represents increasing level of brightness/lightness (i.e. upper level representing white and lower levels representing black).

The C39 barcode standard uses a fixed ratio between the widest and thinnest black and white bars that barcode decoding system 300 interprets to decode the codeword. The C39 start/stop pattern illustrated in FIG. 4 is made up of the following sequence of bars: narrow black; wide white; narrow black; narrow white; wide black; narrow white; wide black; narrow white; and narrow black. Conventionally, how accurate this array of widths is recreated by image sensor 320 of barcode scanner 102 affects the accuracy of interpreting the codeword and the entire barcode 102. Motion between image sensor 320 and barcode 120 can result in motion blur in the captured image that causes errors when decoding barcode 120. The motion blur is proportional to the velocity of the motion. Other barcode standards can encode information using other known methods and are similarly prone to errors from motion as described below.

First graph 400 illustrates the case where the velocity of barcode 120 with respect to image sensor 320 is zero, i.e. v=0. Detection of black and white bars of barcode 120 can be performed fairly accurately using an edge detection algorithm if the image of barcode 120 has a high signal to noise ratio so that there is sufficient contrast. The vertical lines in the signal indicate a strong contrast between the black and white bars.

Graphs 401, 402, and 403 illustrate effects of increasing velocity (i.e. v=1; v=2; and v=3, where higher values for v indicate greater velocities) between barcode 120 and image sensor 320. The velocity in each graph is related to the slope of each edge of the black and white bars of barcode 120 such that a larger velocity or slope represents a blurrier edge between white and black bars in the image. With a fairly low speed, an edge detection algorithm can still perform relatively well as the signal to noise ratio is still relatively good since a moving target can help average and cancel noise from sources such as dirt in the optical path, light distortion, print quality, cross-talk, bad pixels, etc. Motion causes these noise sources to be distributed and averaged over multiple pixels of image sensor 320. An edge detection algorithm can be adjusted for a lower or higher velocity as will be described below. An edge detection algorithm adjusted for a lower velocity may fail at a higher velocity due to a lower signal amplitude while an edge detection algorithm adjusted to work at a higher velocity may fail at a lower velocity since it is more susceptible noise. Failure to properly adjust the edge detection algorithm for the appropriate velocity will result in failure to detect edges of the black and white bars and failure to decode barcode 120. Alternatively, a different or variation of the edge detection algorithm can be selected based on velocity.

Graphs 400, 401, 402, and 403 illustrate how the upper and lower detection limits of an edge detection algorithm, shown as horizontal lines, can be adjusted to accurately detect the edges of features of barcode 120. Selecting a higher detection threshold, such as that shown in graph 400 where the upper detection limit for detecting a black to white transition is near the maximum signal level and the lower detection limit for detecting a white to black transition is near the minimum signal level, helps to filter noise from the captured image and performs well in high contrast and/or low velocity conditions. Graphs 401, 402, and 403 illustrate selecting a lower detection threshold where the upper detection limit and lower detection limit are adjusted to accurately capture the width of the bars from the signal. The upper detection limit captures a white bar and the lower detection limit captures a black bar. Although the lower detection threshold has less distance between the upper and lower detection limits that may make the detection algorithm more susceptible to noise, a lower detection threshold can be used for higher relative velocity conditions where noise in the optical path is averaged over multiple pixels of image sensor 320.

Edge detection processing based on thresholds is provided as an example of how knowledge of the velocity between barcode 120 and image sensor 320 can be used to adjust the edge detection processing. Other edge detection algorithms that use a different edge detection mechanism can also be adjust based on the velocity information. Some edge detection algorithms use a derivative of the scan to determine the edges of the features of barcode 120 (i.e. where the second derivate is zero indicates a change in contrast between the features of barcode 120). Since higher velocities can effectively cancel spurious noise, these derivative-based edge detection algorithms can also use the velocity between image sensor 320 and barcode 120 to adjust the edge detection processing such that the algorithm can be adjusted to be more sensitive to changes in the derivatives to determine the edges of the features of barcode 120. Accordingly, other edge detection algorithms can be adjusted based on the velocity between the image sensor 320 and barcode 102 to either compensate for the cancelled spurious noise in the captured image or the less prominent edges of features of barcode 120 in the captured image.

Figure 5:
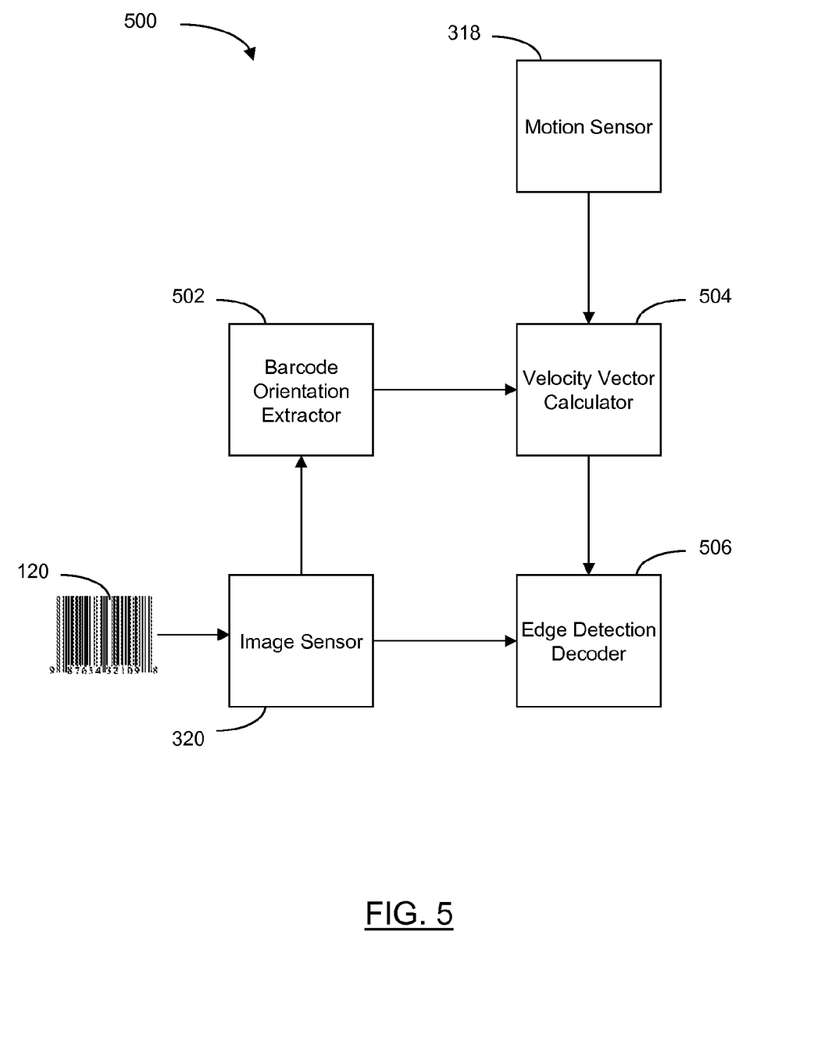
FIG. 5 is a block diagram of relevant elements of a barcode decoding system that provide motion compensation and barcode decoding functionality.

Referring now to FIG. 5, a block diagram 500 of relevant elements of barcode decoding system 300 that provide motion compensation and barcode decoding functionality is shown. Image sensor 320 and motion sensor 318 can be implemented as separately packaged parts, provided only that, motion sensor 318 must move with image sensor 320. Remaining elements, such as barcode orientation extractor 502 velocity vector calculator 504, and edge detection decoder 506, can be implemented either together or separately, and, at least in part, as software code executed on processor 302 or implemented in custom logic, such as an ASIC or programmable logic device, including but not limited to FPGAs or DSPs. The term "processor" as used herein can refer to a microprocessor, such as processor 302, or a custom logic solution, such as an ASIC or FPGA.

Image sensor 320 captures an image of barcode 120. Typically, the capture operation is initiated through a user's interaction with handheld computing device 100 or barcode scanner 102. The captured image typically includes barcode 120 and the surrounding background.

The captured image from image sensor 320 is then provided to barcode orientation extractor 502 that determines the orientation of barcode 120 in the captured image. Barcode orientation extractor 502 processes the captured image to determine the orientation of barcode 120 within the captured image based on, for example, the skew of barcode 120 or the angle of features of barcode 120. The determined orientation of the captured image of barcode 120 is provided to velocity vector calculator 504.

Velocity vector calculator 504 uses acceleration data provided from motion sensor 318 to determine velocity, as will be described below. Velocity vector calculator 504 uses the determined orientation and the determined velocity, to determine the velocity of barcode scanner 102 in a direction perpendicular to barcode features (i.e. the long side of bar in a 1D barcode or the side of a cell in a 2D barcode).

Barcode orientation extractor 502 can determine the orientation of bars of a 1D barcode or the squares or rectangles of a 2D barcode using any suitable image processing algorithm as will occur to those skilled in the art. In one embodiment, image processing can convert the captured image to binary using dynamic thresholding and then use chain-code processing to effectively outline the features of barcode 120 in the captured image. The result of chain-code processing for each feature of barcode 120 will be the smallest wrapping rectangle. The orientation of these rectangles can then provide the best statistical orientation of the features of barcode 120.

Alternatively, barcode orientation extractor 502 can use image processing based on the correlation of multiple scan directions. First, the image processing algorithm can detect the location of barcode 120 within the captured image. Next, several short scans are performed at different angles through the detected location to detect the edges of the features of barcode 120. Scans at angles that have the highest mutual correlation correspond to the angle that is perpendicular to the features of barcode 120 to determine orientation.

In other embodiments, barcode orientation extractor 502 can also be provided with position data from motion sensor 318 to determine the position of barcode scanner 102 in free space (relative to a reference position) to assist with determining the orientation of barcode 120 based on a presumed or statistical orientation of barcode 102. For example, if the majority of barcodes are parallel with the horizon, this information can assist the orientation extraction process. Barcode orientation extractor 502 can also provide a preprocessed image to edge detection decoder 506 such that the image has been de-skewed and/or background information removed.

Velocity vector calculator 504 determines the velocity of image sensor 320 that is associated with motion sensor 318. The velocity is preferably calculated for the exposure period of image sensor 320 when capturing the image of barcode 120. The exposure period includes the time that image sensor 320 is collecting light to capture the image. As used herein, the term "exposure period" can also include the time immediately prior to or after capturing the image such that the velocity can be calculated using either prior or post measurements, an average or any other combination thereof.

Determining the velocity of image sensor 320 uses data from motion sensor 318 and then determines the velocity with respect to a direction perpendicular to the edges of features of barcode 120. Velocity can be calculated by applying digital integration to the translational acceleration data from motion sensor 318. Velocity vector calculator can also use the distance between the image sensor 320 and barcode 120 in calculating velocity if motion sensor 318 includes a gyroscope that provides angular acceleration (i.e. pitch, yaw or roll in degrees per second). The distance can be derived from the variable or managed focus information from image sensor 320.

If barcode 120 is a linear barcode, velocity vector calculator 504 determines the velocity of image sensor 320 in a direction perpendicular to the edges of the bars that comprise barcode 120 in the captured image. With a 2D barcode, velocity vector calculator can determine a velocity in directions perpendicular to the edges of the 2D barcode features. Most current 2D barcode have orthogonal features (i.e. squares or rectangles) but other variations can use triangles, hexagons or other geometric shapes that can require determining the velocity in more than two directions.

Velocity vector calculator 504 uses acceleration data provided by motion sensor 318 to adjust a previously calculated velocity of image sensor 320. Velocity can be continuously updated by acceleration data from motion sensor 318. Velocity vector calculator 504 can use a motion model, such as a periodic (or quasi-periodic) motion model that simulates motion of the human hand, to assist with determining the velocity from the acceleration data. Generally, velocity information cannot be obtained strictly from acceleration data without knowledge of an initial velocity. Using a motion model allows velocity vector calculator 504 to recover velocity from acceleration data. For example, in a simplified pendulum motion model when acceleration changes from one direction to an opposite direction, the simplified pendulum motion model provides that the object had a velocity of zero some time between the change in direction of acceleration. A motion model can be selected based on acceleration data or position information from motion sensor 318 so that velocity can be determined accurately based on acceleration data. For example, position data based on acceleration data from motion sensor 318 can also be used to select an appropriate motion model based on the orientation of how barcode scanner 102 is being held by an operator.

Periodic motion models are based on the fact that most motion activities in the human body are happening at 8 Hertz and below. Periodic motion appears in hand jitter patterns that are a common source of image blur with a handheld image sensor 320. Typically, image sensor 320 captures an image in 10-20 ms in average light condition (e.g. an office environment with a brightness of approximately 300 lux) this provides a capture time that is less that ⅛ of the period of human body motion. Using a periodic motion model, velocity vector calculator 504 can interpolate a constant velocity (assuming no acceleration between image parts) during the period that the image was captured by image sensor 320.

One example of a motion model can include a pendulum-like motion where acceleration and velocity are shifted relative to each other by a quarter period and their amplitudes are proportional to each other. Other embodiments can include other motion models or more complicated motion models that better fit the acceleration data received by velocity vector calculator 504. For example, in some embodiments velocity vector calculator 504 can select a motion model or frequency based on received acceleration data from motion sensor 318. Preferably, at least two periods of periodic motion are used to select a frequency. The received acceleration data can include acceleration data for past image captures and can be associated with a user profile so that a motion model may be refined for a particular user.

Edge detection decoder 506 processes the captured image using an edge detection algorithm to determine the edges of the features of barcode 120 in order to decode barcode 120. Edge detection decoder 506 determines at least one parameter for edge detection processing of the barcode 120 based on the velocity (including direction(s)) received from velocity vector calculator 504. Edge detection decoder 506 can make this determination based on the velocity perpendicular to the features of barcode 120 provided by velocity vector calculator 504. Edge detection decoder 506 determines the amount of motion-induced image blur using the determined velocity received from velocity vector calculator 504 and any one or combination of the following factors including, but not limited to: size of features of barcode 120; the resolution of image sensor 320; and the focal distance of the lens. The amount of velocity induced blur is used to select parameters to adjust and/or select the edge detection algorithm.

For example, edge detection decoder 506 can use the resolution of image sensor 320 and the determined velocity to determine that 2.5 pixels are affected by gradient shading due to the determined velocity provided by velocity vector calculator 504. If the minimum size of features of barcode 120 is 10 pixels, then no adjustment, or a very minimal adjustment, would be required to adjust for the motion-induced image blur. However, if the minimum size of features of barcode 120 is 3 pixels then edge detection decoder 506 may select parameters to adjust the upper and lower detection limits of the edge detection algorithm. The appropriate parameter(s) is/are selected to adjust the edge detection algorithm (or to select the appropriate edge detection algorithm) to accurately detect the edges of features of barcode 120 to compensate for the motion-induced image blur from the determined velocity.

Edge detection algorithms typically operate to detect a change in contrast at a point in the image (e.g. between a black and white bar in barcode 120) and then compares that change in contrast to a detection limit to determine whether an edge exists. Edge detection decoder 506 can adjust these detection limits based on the velocity of barcode scanner 102.

As demonstrated in FIG. 4, higher velocities can require a lower detection threshold. Once the edges of the features of the barcode 120 are detected, the barcode features can be identified in order to decode barcode 120.

The detection thresholds as illustrated in FIG. 4 are provided as one example of a parameter for edge detection processing. Other parameters used to adjust edge detection processing can include edge position, edge shape or edge pattern. For example, the edge shape can be affected by noise from image sensor 320 or noise inherent in barcode 120 that may be due to dirt in the optical path, light distortion, print quality, etc. that the algorithm needs to separate from the motion-induced image blur. Edge pattern information can be used to tune the algorithm based on a start/stop pattern or a fixed ratio between the bars and spaces. Another parameter could be used to select an appropriate edge detection algorithm such as, for example, using a differential edge detection algorithm.

Figure 6:
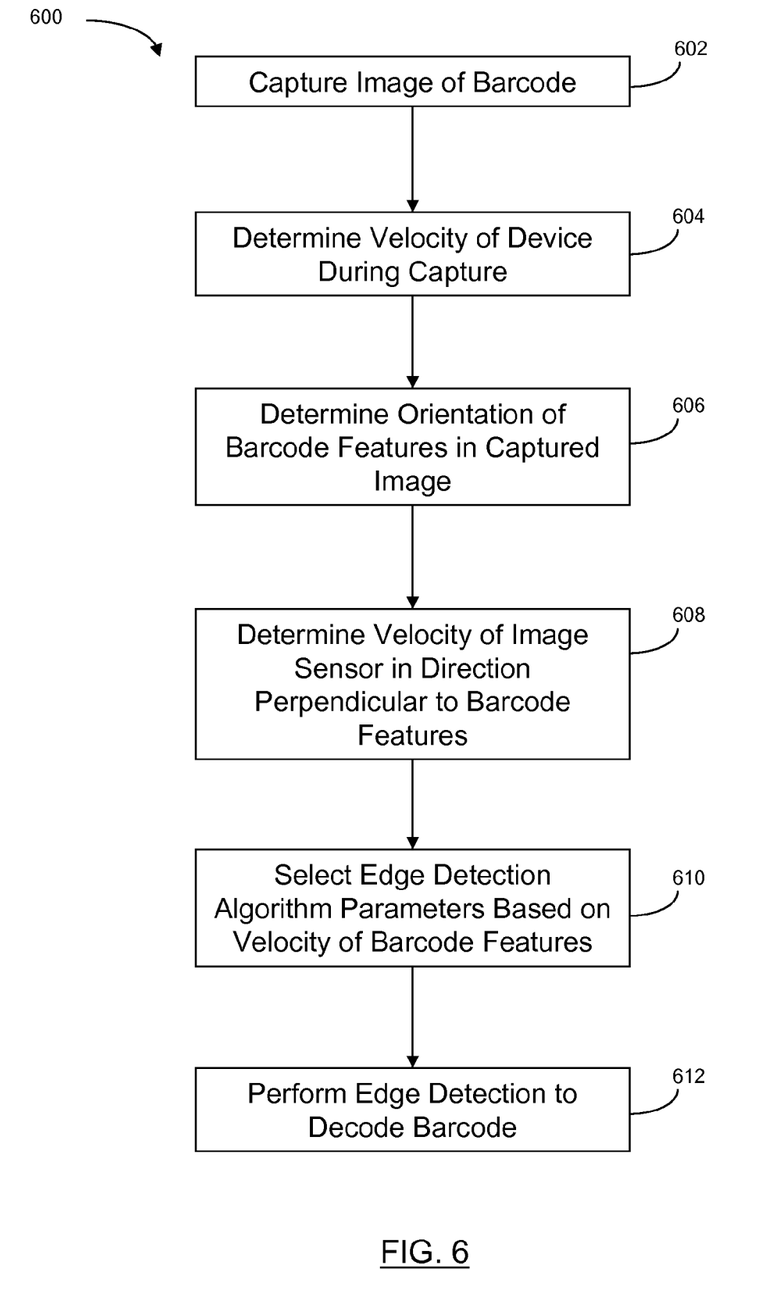
FIG. 6 is a flowchart illustrating a method for compensating for motion between an image sensor of a barcode scanner relative and a barcode to improve barcode decoding.

Referring now to FIG. 6, a flowchart 600 is shown illustrating an example method for compensating for motion between image sensor 320 of barcode scanner 102 and barcode 120 to improve barcode decoding. At step 602, an image of barcode 120 is captured using image sensor 320 of barcode scanner 102. Capturing the image is typically initiated by a user of handheld computing device 100 through a user interface interaction, such as pressing a key of keyboard 104 or specifically tasked button or trigger of barcode scanner 102.

At step 604, the velocity of barcode scanner 102 is determined during the period of time the image was captured by image sensor 320. Depending on the construction of image sensor 320, ambient lighting conditions and the type and printing of barcode 120, image sensor 320 can take from 10 to 60 milliseconds to capture the image. The velocity is determined from the acceleration data provided by motion sensor 318. Acceleration data is used along with a motion model in order to determine the velocity. The velocity of image sensor 320 is continually adjusted between (or just prior to) capture events based on the acceleration data and the motion model.

At step 606 the orientation of features of barcode 120 in the captured image is determined. The captured image can be processed to determine the orientation by detecting the skew or angle of barcode 120 and its features. Orientation information is used to determine the orientation of features of the barcode in the captured image with respect to the axes of measurement of motion sensor 318 in order to determine velocity in a direction along barcode 120. This is calculated in step 608 where the orientation and velocity are used to determine the velocity of image sensor 320 in a direction substantially perpendicular to edges of the features of barcode 120. With a 2D barcode, a plurality of velocities can be determined such that each velocity is substantially perpendicular to one of a plurality of edge of features of the barcode. With orthogonal 2D barcodes this involves calculating two velocities that are perpendicular to each other but other 2D barcodes can use non-orthogonal shapes (e.g. triangles) as barcode features that can require determining three different velocities. This can involve mapping a velocity vector calculated in step 604 to the direction of the edges of the features of barcode 120.

Once the velocity/velocities is/are determined with respect to the edges of the features of barcode 120 in the captured image, in step 610 at least one parameter is selected for edge detection processing of barcode 120 based on the determined velocity to compensate for blurring of the captured image due motion between image sensor 320 of barcode scanner 102 and barcode 120. The parameter can include a sensitivity threshold that is selected based on the determined velocity so that a lower sensitivity is selected for higher velocities. Other parameters of edge detection processing that can be adjusted based on velocity can include any one of edge position, edge shape, or an edge pattern.

At step 612 the edge detection processing commences using the provided parameters to process the captured image of barcode 120 to detect the edges of the features of barcode 120 in order to identify barcode symbols for decoding.

While the embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A method for compensating for motion between an image sensor and a barcode, the method comprising:
determining a velocity between the image sensor and the barcode based on acceleration data of an image of the barcode, the acceleration data provided by a motion sensor;
selecting at least one parameter for edge detection processing of the image of the barcode based on the determined velocity to compensate for blurring of the image due to the determined velocity; and
detecting edges of features of the barcode in the image of the barcode using the at least one parameter to decode the barcode.

2. The method of claim 1, wherein determining the velocity further comprises:
converting the image of the barcode to binary based on dynamic thresholding;
outlining features of the barcode using chain-code processing, wherein a wrapping rectangle is produced for each one of the features of the barcode;
determining orientation of the features of the barcode based on an orientation of the wrapping rectangle of each one of the features of the barcode; and
determining the velocity in a direction substantially perpendicular to edges of features of the barcode by referencing the orientation of features of the barcode and the axes of the motion sensor.

3. The method of claim 1, wherein determining the velocity further comprises:
calculating a previous velocity of the image sensor; and
adjusting the previous velocity with the acceleration data;
wherein calculating the previous velocity and adjusting the previous velocity with the acceleration data are based on a motion model, the motion model being selected based on one or more of position information and the acceleration data provided by the motion sensor.

4. The method of claim 1, wherein the at least one parameter is selected based on the determined velocity.

5. The method of claim 4, wherein the at least one parameter comprises a derivative of the image of the barcode.

6. The method of claim 1, wherein the at least one parameter comprises a sensitivity threshold based on the determined velocity and a lower sensitivity is selected for a higher determined velocity.

7. The method of claim 1, wherein the acceleration data is associated with a user profile.

8. The method of claim 1, wherein the acceleration data comprises time stamp data of the image of the barcode.

9. A barcode decoding system comprising:
a processor configured to:
determine a velocity of motion between an image sensor and a barcode based on acceleration data of an image of the barcode,
select at least one parameter for edge detection processing of the image of the barcode based on the determined velocity to compensate for blurring of the image of the barcode due to the determined velocity, and
detect edges of features of the barcode in the image of the barcode using the at least one parameter to decode the barcode.

10. The system of claim 9, wherein the processor is further configured to determine the velocity by:
converting the image of the barcode to binary based on dynamic thresholding;
outlining features of the barcode using chain-code processing, wherein a wrapping rectangle is produced for each one of the features of the barcode;
determining orientation of the features of the barcode based on an orientation of the wrapping rectangle of each one of the features of the barcode; and
determining the velocity in a direction substantially perpendicular to edges of features of the barcode by referencing the orientation of features of the barcode and the axes of the motion sensor.

11. The system of claim 9, wherein the processor is further configured to determine the velocity by:
calculating a previous velocity of the image sensor; and
adjusting the previous velocity with the acceleration data;
wherein calculating the previous velocity and adjusting the previous velocity with the acceleration data are based on a motion model, the motion model being selected based on one or more of position information associated with the image sensor and the acceleration data.

12. The system of claim 9, wherein the processor is further configured to select the at least one parameter based on the determined velocity.

13. The system of claim 12, wherein the at least one parameter comprises a derivative of the image.

14. The system of claim 9, wherein the at least one parameter comprises a sensitivity threshold based on the determined velocity and the processor is further configured to select a lower sensitivity for a higher determined velocity.

15. The system of claim 9, wherein the processor is further configured to associate the acceleration data with a user profile.

16. The system of claim 9, wherein the acceleration data comprises time stamp data of the image.

17. A computer program product comprising a non-transitory computer-useable medium having a computer-readable program code that implements a method for compensating for motion between an image sensor and a barcode, the method comprising:
determining a velocity between the image sensor and the barcode based on acceleration data of an image of the barcode, the acceleration data provided by a motion sensor;
selecting at least one parameter for edge detection processing of the image of the barcode based on the determined velocity to compensate for blurring of the image due to the determined velocity; and
detecting edges of features of the barcode in the image of the barcode using the at least one parameter to decode the barcode.

18. The computer program product of claim 17, wherein determining the velocity further comprises:
converting the image of the barcode to binary based on dynamic thresholding;
outlining features of the barcode using chain-code processing, wherein a wrapping rectangle is produced for each one of the features of the barcode;
determining orientation of the features of the barcode based on an orientation of the wrapping rectangle of each one of the features of the barcode; and
determining the velocity in a direction substantially perpendicular to edges of features of the barcode by referencing the orientation of features of the barcode and the axes of the motion sensor.

19. The computer program product of claim 17, wherein determining the velocity further comprises:
calculating a previous velocity of the image sensor;
adjusting the previous velocity with the acceleration data; and
wherein calculating the previous velocity and adjusting the previous velocity with the acceleration data are based on a motion model, the motion model being selected based on one or more of position information and the acceleration data provided by the motion sensor.

20. The computer program product of claim 17, wherein the at least one parameter is selected based on the determined velocity.

* * * * *